United States Patent
Guckel et al.

[11] Patent Number: 6,087,743
[45] Date of Patent: Jul. 11, 2000

[54] POSITION CONTROL SYSTEM FOR USE WITH MICROMECHANICAL ACTUATORS

[75] Inventors: Henry Guckel; Eric W. Stiers, both of Madison, Wis.

[73] Assignee: Wisconsin Alumni Research Foundation, Madison, Wis.

[21] Appl. No.: 09/150,687

[22] Filed: Sep. 10, 1998

[51] Int. Cl.[7] ................................................. H02K 33/10
[52] U.S. Cl. ............................... 310/40 MM; 318/607; 324/236
[58] Field of Search ............................... 310/17, 28, 29, 310/30, 36, 40 MM, 42; 324/207.15, 207.16, 236, 655; 318/607, 619, 662; 219/69.16

[56] References Cited

U.S. PATENT DOCUMENTS

| | | | |
|---|---|---|---|
| 3,057,195 | 10/1962 | Bently et al. | 73/862.61 |
| 3,074,279 | 1/1963 | Morris | 318/675 |
| 3,102,217 | 8/1963 | Bullen | 73/514.21 |
| 3,182,241 | 5/1965 | Ollivier et al. | 318/607 |
| 3,457,481 | 7/1969 | Riley | 318/676 |
| 3,461,400 | 8/1969 | Koda | 331/65 |
| 3,541,849 | 11/1970 | Corbett | 73/862.59 |
| 3,662,595 | 5/1972 | Hurlburt et al. | 73/862.61 |
| 3,944,903 | 3/1976 | Clegg | 318/606 |
| 3,970,911 | 7/1976 | Schmall | 318/607 |
| 4,021,681 | 5/1977 | Miesterfeld | 307/102 |
| 4,810,966 | 3/1989 | Schmall | 324/236 X |
| 5,198,764 | 3/1993 | Spencer | 324/207.26 |
| 5,381,698 | 1/1995 | Wiley | 73/861.77 |
| 5,470,043 | 11/1995 | Marts et al. | 251/65 |
| 5,565,722 | 10/1996 | Rubner et al. | 310/90.5 |
| 5,583,290 | 12/1996 | Lewis | 73/514.18 |
| 5,602,411 | 2/1997 | Zettler | 257/417 |
| 5,644,177 | 7/1997 | Gucket et al. | 310/40 MM |
| 5,767,672 | 6/1998 | Guichard et al. | 324/263 |
| 5,808,384 | 9/1998 | Tabat et al. | 310/40 MM |

OTHER PUBLICATIONS

H. Guckel, et al., "Electromagnetic Linear Actuators with Inductive Position Sensing," Sensors and Actuators, vol. A53, 1996, pp. 386–391, (Month Unknown).

S. Suzuki, et al., "Semiconductor Capacitance–Type Accelerometer with PWM Electrostatic Servo Technique," Sensors and Actuators, vol. A21–23, 1990, pp. 316–319. (Month Unknown).

T. Earles, et al., "Magnetic Microactuators for Relay Applications," Proc. of Actuator 96, 5th International Conference on New Actuators, Jun. 26–28, 1996, Bremen, Germany, pp. 132–135.

*Primary Examiner*—Nestor Ramirez
*Assistant Examiner*—Judson H. Jones
*Attorney, Agent, or Firm*—Foley & Lardner

[57] ABSTRACT

A positioning system adapted for use with micromechanical actuators provides feedback control of the position of the movable element of the actuator utilizing a low Q sensing coil. The effective inductance of the sensing coil changes with position of the movable element to change the frequency of oscillation of a variable oscillator. The output of the variable oscillator is compared in a phase detector to a reference oscillator signal. The phase detector provides a pulsed output having a pulse duty cycle related to the phase or frequency difference between the oscillator signals. The output of the phase detector is provided to a drive coil which applies a magnetic force to the movable element which balances the force of a spring. The movable element can be displaced to a new position by changing the frequency of the reference oscillator.

10 Claims, 4 Drawing Sheets

POSITION CONTROL SYSTEM FOR USE WITH MICROMECHANICAL ACTUATORS

This invention was made with United States government support awarded by the following agencies: DOD-Army grant No: DABT63-93-C-0066; DOD-AF Grant No: F33615-95-C-1764; DOE Grant No: AV-5723; and ONR Grant No: N00014-93-1-0911. The United States has certain rights in this invention.

FIELD OF THE INVENTION

This invention pertains generally to the field of positioners and actuators, particularly to micromechanical actuators, and to control devices for such actuators.

BACKGROUND OF THE INVENTION

Significant advances have been made in the development of miniaturized electromechanical devices useful for a variety of purposes, such as electrical and optical switches. Examples of such devices are described in, for example, T. Earles, P. Mangat, J. Klein, and H. Guckel, "Magnetic Microactuators for Relay Applications," Proc. of Actuator 96, 5th International Conference on New Actuators, Jun. 26–28, 1996, Bremen, Germany, pp. 132–135, and U.S. Pat. No. 5,644,177, entitled Micromechanical Magnetically Actuated Devices. Such micromachined actuators are well suited for use in switches in which, generally, a stream of electronic, optical, or molecular flux is mechanically directed from a pole channel to either of two throw channels. Supplying a sufficient current to a drive coil switches the movable element of the actuator to one of its terminal positions; it can be returned to its other terminal position either by use of a second coil which is alternately activated or by a spring which biases the movable element of the actuator to its normal stationary or latched position when current to the coil of the actuator is cut off.

For many applications, it is desirable to be able to adjust the position of the movable element of an electromagnetic actuator, either continuously or in steps, until the element is at a position intermediate the terminal positions of the actuator. Examples of applications for such actuators include certain types of multi-position optical switches and computer hard drive head controllers. A micromechanical plunger supported by a spring, for example, may be drawn by the magnetic field from a drive coil, supplied with a selected level of current, to an intermediate position at which the spring return force is balanced by the magnetic attraction force from the drive coil. In order to provide sufficient positional accuracy for such a system, it is necessary to feed back a signal related to the displacement of the plunger to control the drive current to the coil so that the plunger reaches and remains at its desired commanded position. Some type of sensor must thus be used to detect the position of the plunger. Commonly used position sensors in larger mechanical systems include variable reactive elements, i.e., capacitors or inductors, the reactances of which change with the position of the moveable element. For example, a sensing coil may be mounted adjacent to a plunger formed of ferromagnetic metal such that the inductance of the sensing coil changes with the position of the plunger. However, in micromechanical systems, any sensing elements—coils or capacitors—must necessarily be quite small, so that the resistance of the element relative to its reactance is generally greater than would be found in sensing elements for larger mechanical systems. The relatively low Q factor for such micromechanical sensing systems thus makes the use of resonant circuit detectors of the type used in large mechanical systems subject to unacceptably large errors in sensing accuracy.

SUMMARY OF THE INVENTION

In accordance with the present invention, a simple, inexpensive, compact and high precision positioning system is provided which is well suited for use with micromechanical actuators. The positioning system allows the feedback control of the position of a moving element in a micromechanical actuator to move the element to a desired position within its range of movement, and to maintain the element at that position in the presence of disturbances. The positioning system can utilize low Q sensing coils to sense the position of the moving element while nonetheless providing precise positioning of the moving element.

The position control system of the invention incorporates the mechanical actuator system into a phase-locked loop which is synchronized to a signal from a reference oscillator at a selected reference frequency. A sensing coil is coupled to the movable element of the mechanical actuator system such that the effective inductance of the sensing coil changes with a change in position of the movable element. The sensing coil is part of a resonant tank circuit that controls the frequency of oscillation of a variable frequency oscillator. The output signal of the variable frequency oscillator is compared in a phase detector with the reference oscillator signal, and the phase detector provides a pulsed output signal having a pulse duty cycle that is related to the phase or frequency difference. This output signal is provided as a drive signal to the drive coil of the actuator. When the movable element is at a stable position, the frequency of the output signal of the variable frequency oscillator matches the reference oscillator frequency, and with a constant phase difference between the two signals, which results in power provided to the drive coil at a level such that the magnetic force applied by the drive coil is balanced by a restoring spring force so that the movable element is stationary. Any mechanical disturbance of the movable element, e.g., from external vibrations, results in a change of the phase difference between the variable oscillator signal and the reference oscillator signal, which serves to increase or decrease the duty cycle of the pulsed drive power to the drive coil as appropriate to move the movable element back to the desired position.

The position of the movable element can be selectively changed, e.g., in a stepwise manner, by changing the frequency of the reference oscillator signal. If the movable element of the actuator is to be displaced to a new position, the output signal of the reference oscillator is changed to a frequency which is known to correspond to that position. A stepwise increase in the reference oscillator frequency results in a change in the output signal from the phase detector which is provided to the drive coil that reduces the magnetic field force on the movable element, allowing the spring to move the movable element in a direction to reduce the inductance of the sensing coil and thus increase the resonant frequency of the variable oscillator circuit until its frequency matches that of the reference oscillator. The difference in phase between the two oscillator signals then stabilizes at a new stationary position of the movable element. Conversely, a stepwise decrease in the reference oscillator frequency results in a change in the output drive signal from the phase detector to the drive coil that increases the magnetic field from the drive coil, moving the mechanical system in a direction to increase the inductance of the sensing coil and lower the frequency of oscillation of the variable oscillator circuit until it matches the frequency of the reference oscillator. The movable element then stabilizes at a position at which there is constant phase difference between the reference oscillator signal and the variable oscillator signal.

The positioning control circuit of the invention may be implemented using simple, inexpensive circuit components. The variable oscillator circuit that incorporates the sensing coil, in particular, may be implemented as a simple positive feedback circuit using a conventional amplifier. Nonlinear feedback is provided in the oscillator circuit to limit oscillation growth. Incorporation of the sensing coil in the variable oscillator circuit in this manner provides a sensitive measure of moving element position that is relatively stable over time and with respect to changes in ambient temperature and component values.

Further objects, features and advantages of the invention will be apparent from the following detailed description when taken in conjunction with the accompanying drawings.

DETAILED DESCRIPTION OF THE INVENTION

Figure 1:
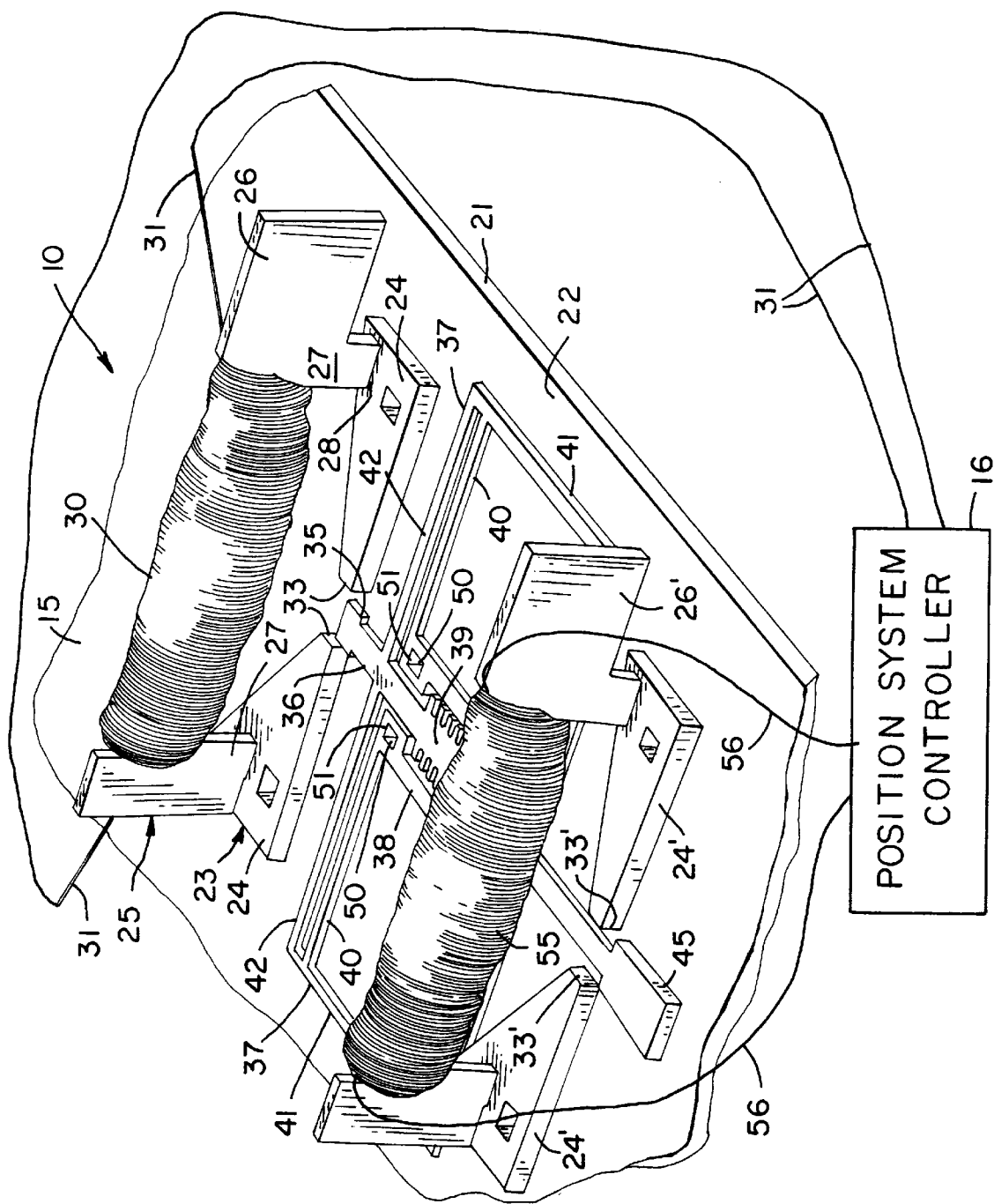
FIG. 1 is a perspective view of an exemplary micromechanical actuator incorporating the positioning system of the invention.

For purposes of illustrating the principles of the present invention, an exemplary mechanical actuator system is shown generally at 10 in FIG. 1. It includes a magnetically actuated mechanical linear actuator 15 and a positioning system controller 16 which, as described further below, functions to sense the position of the movable element of the actuator 15 and to provide drive current to the actuator to control its position.

The mechanical actuator 15 of FIG. 1 may be formed, for example, as described in U.S. Pat. No. 5,644,177, and is shown for purposes of illustrating the invention only, it being understood that the present invention may be incorporated in any other suitable type of magnetically actuated mechanical actuator, and is particularly useful for micromechanical actuators. The actuator 15 is formed on a substrate 21, which may have a generally planar top surface 22 as shown. The substrate 21 may be formed of a variety of materials, including metals, plastics, ceramics, glasses, and semiconductors. Where electronic components are to be integrated with the actuator 15, it is preferable that the substrate 21 be a semiconductor, such as single crystal silicon. The actuator 15 includes a fixed magnetic core 23 having two separate sections 24 formed on the surface 22 of the substrate 21. As illustrated in FIG. 1, the core sections 24 are formed generally in a planar fashion on the planar surface 22 of the substrate 21. In addition, a coil section 25 has an upright mandrel 26 which forms part of the magnetic core. The mandrel 26 has end sections 27 with pegs 28 formed thereon by which the mandrel engages the fixed sections 24 of the core formed on the substrate. A coil 30 of fine electrical wire, having outlet leads 31 connected to the controller 16 to receive power therefrom, is wound around a central core portion of the mandrel 26 (obscured by the coil 30 in FIG. 1). Both the mandrel 26 and the fixed core sections 24 are formed of a ferromagnetic metal, such as nickel, iron, or nickel-iron alloys. End faces 33 of the core sections 24 are spaced from one another to define a gap into which a magnetic head 35 of an actuator plunger 36 extends. The plunger 36 forms the movable element of the actuator. The plunger 36, or at least the head thereof, is also formed of a magnetic material, for example a ferromagnetic metal. The plunger 36 is supported for linear movement by springs 37 which preferably provide a highly linear spring force. The springs 37 illustrated in FIG. 1 are rectangular type springs having a mounting section 38 on either side of the central body portion 39 of the actuator plunger 36, with openings 51 therein by which the springs are mounted to posts 50 extending from the substrate, outwardly extending sections 40 which join an outward end section 41, and inwardly extending sections 42 which extend from the end section 41 to join the plunger body 39. The spring sections 40, 41 and 42 are free of the substrate 21 and thus can move as the plunger 36 moves.

A sensing coil 55 may be mounted, as shown in FIG. 1, on a mandrel 26' which is engaged to core sections 24' having end faces 33' adjacent to a head section 45 of the plunger 26. The ferromagnetic material of the head section 45 is coupled to the sensing coil 55 so that the inductance of the sensing coil changes with the position of the plunger 28. The mandrel 26' and fixed core sections 24' may be formed in the same manner as the mandrel 26 and the core sections 24. As the plunger is drawn magnetically into the gap between the end faces 33 of the core sections 24, the head section 45 is moved into the gap between the end faces 33' to thus increase the effective inductance of the sensing coil 55. The sensing coil 55 is connected by wires 56 to the positioning system controller 16, which utilizes the signal from the sensing coil to determine the position of the plunger 26. It is a particular advantage of the present invention that precision positioning can be obtained with a sensing coil 55 having a very low Q factor, e.g., Q=0.1 to 1.0, as is typically the case for micromechanical systems.

Figure 2:
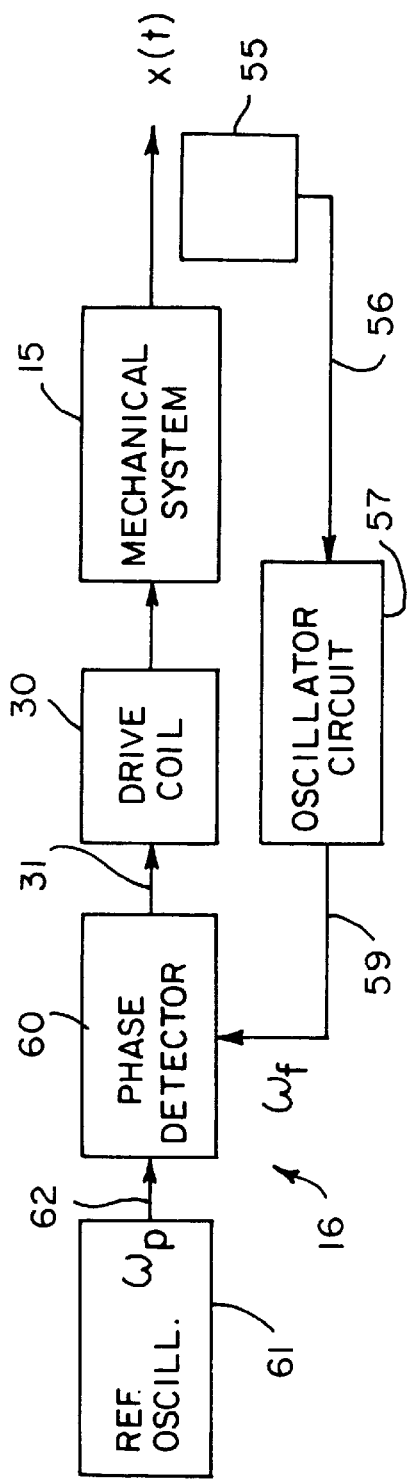
FIG. 2 is a block diagram of the micromechanical actuator and positioning system of the invention.

A block diagram of the components of the positioning system controller 16 as coupled to the actuator system 15 is shown in FIG. 2. As illustrated therein, the controller 16 includes a variable oscillator circuit 57 to which the sensing coil 55 is connected by the lines 56. The variable oscillator circuit 57 provides an output signal on a line 59 at a frequency $\omega_f$ to a phase detector 60. An adjustable frequency reference oscillator 61, which may be any suitable oscillator, such as a commercially available adjustable frequency signal generator, provides an output signal on a line 62 to the phase detector 60 at a reference frequency $\omega_r$. The phase detector 60 provides a pulsed output signal on the lines 31 to the drive coil 30 with a pulse duty cycle that is related to the phase difference between the variable oscillator output signal and the reference oscillator output signal where the reference oscillator frequency $\omega_r$ and the variable oscillator frequency $\omega_f$ match each other. When the two frequencies $\omega_r$ and $\omega_f$ are not the same, the phase detector 60 provides a pulsed output signal that, as explained further below, has a pulse width that varies as a function of the difference between the frequencies of the two signals. The drive coil 30 when supplied with the pulses of current provides corresponding pulses of magnetic force to move (or hold) the plunger 36 of the mechanical system 15. The displacement of the plunger affects the inductance of the sensing coil 55. The sensing coil 55 forms part of a resonant tank circuit in the oscillator circuit 57 that determines the frequency of oscillation of the variable oscillator 57. Thus, the mechanical system 15 can be controlled by control of the adjustable reference oscillator 61 by changing the frequency $\omega_r$ of the reference output signal on the lines 62 provided to the phase detector 60. By effectively incorporating the mechanical system 15 into a phase locked loop in this manner, very accurate and relatively noise invariant control of the micromechanical system is obtained utilizing the relatively low Q sensing coil 55, and in an efficient, cost-effective implementation.

Figure 3:
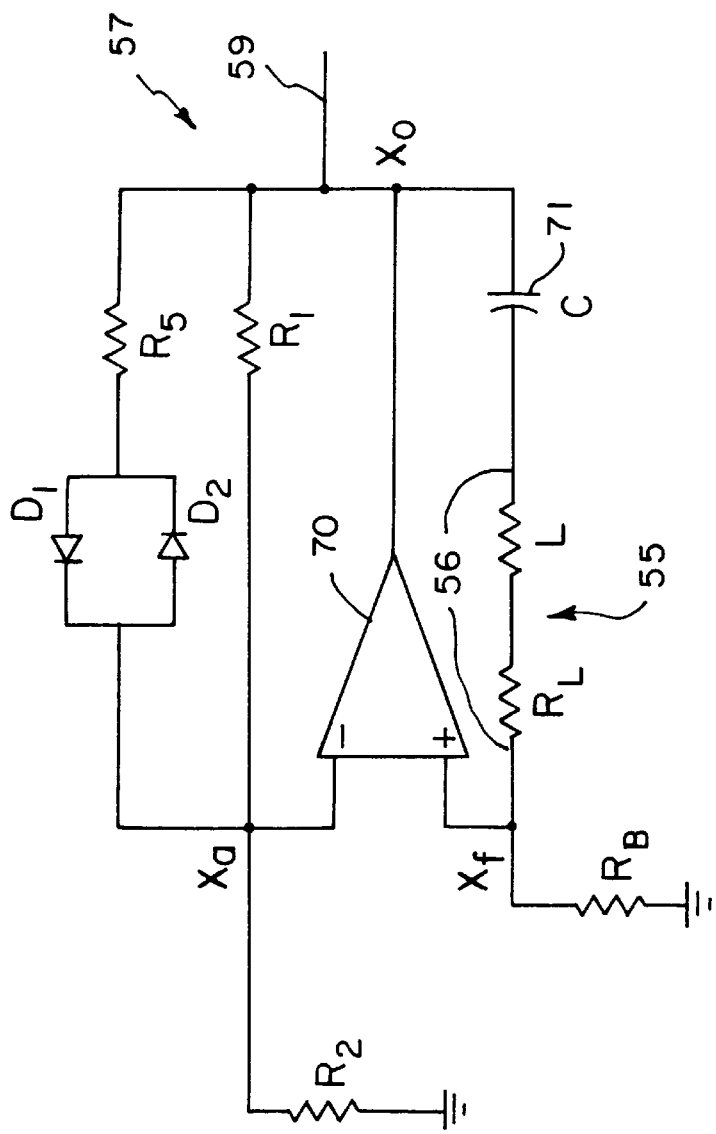
FIG. 3 is a schematic circuit diagram of a variable frequency oscillator that may be utilized in the present invention.

An example of a suitable simple and inexpensive oscillator circuit 57 is shown schematically in FIG. 3. The oscillator circuit 57 comprises a high-gain operational amplifier 70 (e.g., a low cost video amplifier without an internal phase compensation circuit) with a positive feedback loop connected to the positive (non-inverting) input of the amplifier comprising a series resonant tank circuit including the sensing coil 55 (of equivalent inductance L and resistance $R_L$) and a capacitor 71 of capacitance C. A resistor $R_B$ represents the resistance path to ground in the positive feedback loop. A negative feedback loop connected to the negative (inverting) input of the operational amplifier 70 includes a feedback resistor $R_1$, a grounding resistor $R_2$, and a second nonlinear feedback branch in parallel with the resistor $R_1$ comprised of a resistor $R_5$ and paralleled, oppositely conducting diodes $D_1$ and $D_2$. The circuit of FIG. 3 will oscillate at the resonant angular frequency $$\omega_f = \frac{1}{\sqrt{LC}}.$$

To maintain resonance, it is preferable that $R_L/R_B = R_1/R_2$, where $R_L$ and $R_B$ represent resistance in the positive feedback branch of the circuit and the ratio $R_1/R_2$ determines the gain of the amplifier, or, stated equivalently, that the operational amplifier 70 supplies just enough power to compensate for the losses in the system to provide the unity gain required for sustained oscillation. To reduce the effect of variations in resistor values due to thermal or other disturbances, the nonlinear feedback branch comprised of the resistor $R_5$ and the diodes $D_1$ and $D_2$ is used to limit oscillation growth and to reduce sensitivity to small changes in component values. To ensure that oscillations begin, the value of $R_1$ may be set slightly larger than that required for steady state oscillations so that very small signals near zero volts experience a positive exponential growth. Once the signals have sufficient magnitude to forward bias the feedback diodes $D_1$ and $D_2$, the resistor $R_5$ will appear in parallel with the resistor $R_1$, lowering the effective value of the negative feedback loop resistance. When stable oscillations are being produced, any small changes in resistance values will be compensated because of the nonlinear feedback provided by the diodes $D_1$ and $D_2$ which adjusts the effective value of the negative loop feedback resistance to maintain unity loop gain. Because the inductance L is a function of the actuator plunger position x(t), the frequency of the oscillator 57 is indicative of the displacement of the actuator plunger 36. By way of example only, for a micro-sensing coil 55 with (initial) L=64 mH and $R_L$=360 ohms, typical values for other components are: C=0.1 $\mu$F, $R_B$=360 ohms, $R_1$=15 Kohms, $R_2$=10 Kohms, and $R_5$=22 Kohms.

Figure 4:
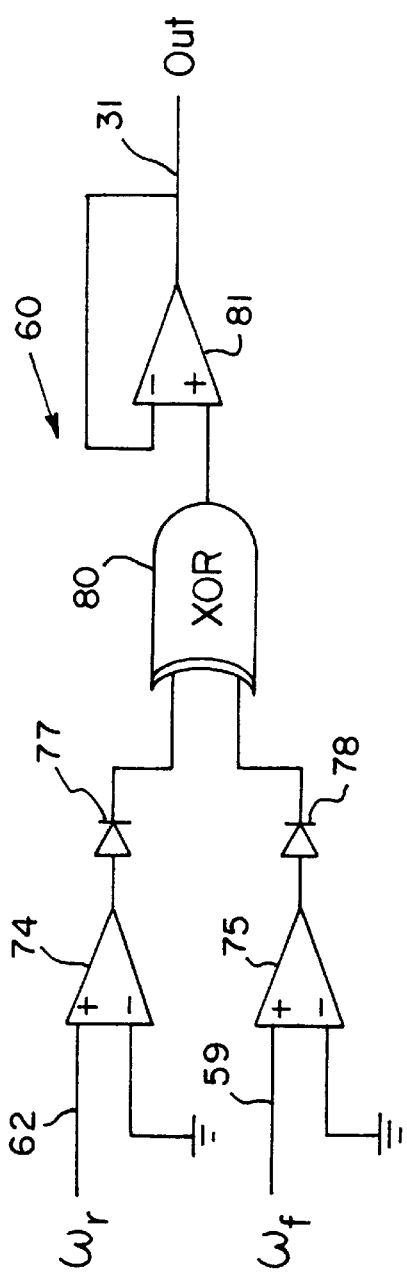
FIG. 4 is a schematic diagram of a phase detector circuit that may be utilized in the invention.
Figure 5A:
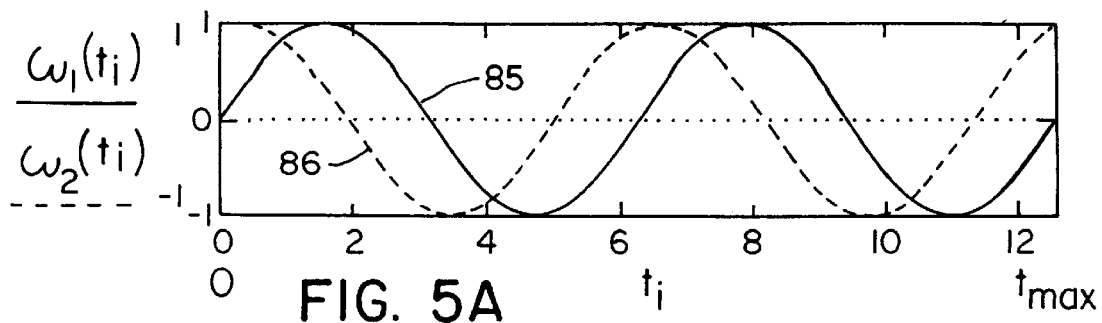
FIGS. 5A–5C are exemplary waveforms of, respectively, the sinusoidal oscillator signals provided to the phase detector circuit of FIG. 4, the square wave outputs of the comparators in the circuit of FIG. 4, and the waveform of the phase detector output signal for such input signals.
Figure 5B:
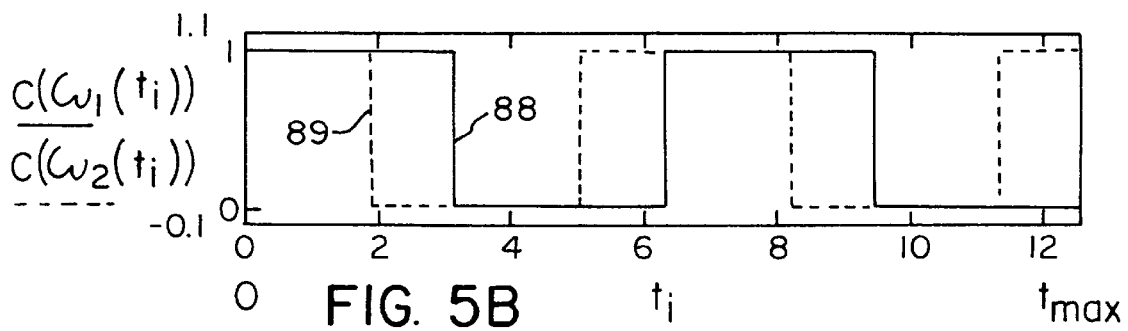
Figure 5C:
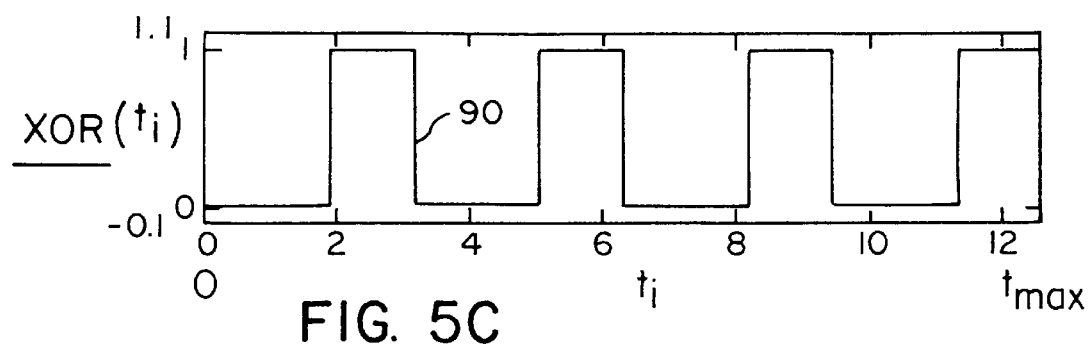
Figure 6:
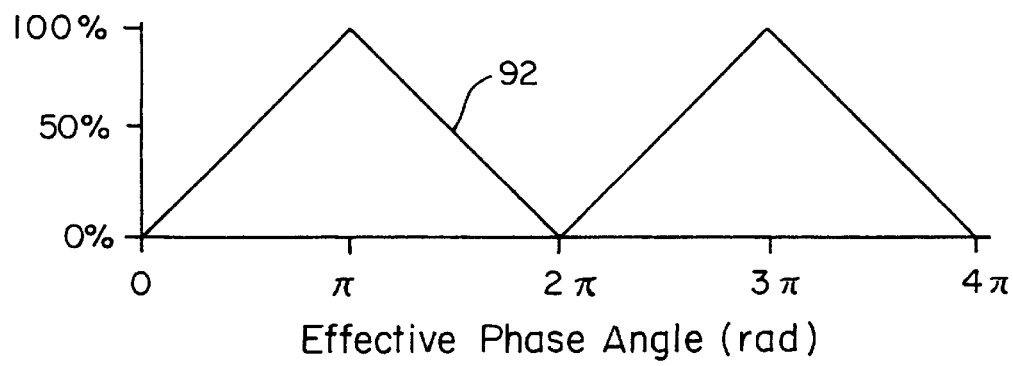
FIG. 6 is a diagram illustrating the output signal duty cycle as a function of phase for the phase detector circuit of FIG. 4.

A schematic diagram of an exemplary phase detector 60 is shown in FIG. 4. The phase detector circuit 60 of FIG. 4 includes a first comparator 74, referenced to ground, which receives the reference oscillator signal on the line 62, and a second comparator 75, referenced to ground, which receives the variable oscillator signal on the line 59. The outputs of the comparators 74 and 75 are provided (through diodes 77 and 78, respectively, to prevent negative potentials from being passed) to an exclusive OR (XOR) gate 80, the output of which is provided to a voltage follower operational amplifier 81. The circuit 60 compares the reference frequency signal supplied on the line 62 to the feedback signal provided on the line 59 from the variable oscillator circuit. The output of the phase detector on the lines 31 is a duty cycle modulated square wave which is used to power the actuator drive coil 30. The comparators 74 and 75 convert the incoming sine waves on the lines 59 and 62 to square waves at the frequencies $\omega_r$ and $\omega_f$ of the reference oscillator and the variable oscillator, respectively. The output of the exclusive OR (XOR) gate 80 will be in the logical high state when the inputs received from the comparators 74 and 75 are in different states, one high and one low, and will be low otherwise. The output of the XOR gate 80, as passed through the amplifier 81, is a string of voltage pulses which are only high when the two input signals from the comparators 74 and 75 differ. The width of the pulses provided from the XOR gate 80 is effectively the time lag between the reference oscillator signal on the line 62 and the variable oscillator signal on the line 59, and is directly proportional to the phase difference between these two signals when the signals are at the same frequency, as illustrated in FIGS. 5A–5C. FIG. 5A shows the sine wave input signals 85 and 86 on the lines 62 and 59, respectively, FIG. 5B shows the corresponding outputs 88 and 89 of the comparators 74 and 75, respectively, and Fig. C shows the output 90 of the XOR gate 80. For example, for a 0° phase shift, the input signals are either both positive or negative at all times, and the outputs of the comparators are identical, causing the pulse output signal 90 of the exclusive XOR gate 80 to be at a 0% duty cycle. Conversely, at 180° phase shift, the signals from the two comparators always have different polarity, and the pulse output of the XOR gate goes to a 100° duty cycle. For phase shifts larger than 180° or less than 0°, the duty cycle changes as a triangle wave function 92 of the phase difference, as illustrated in FIG. 6.

The voltage pulses from the phase detector result in corresponding pulses of current in the coil 30 at a frequency twice the reference signal frequency $\omega_r$ (e.g., $\omega_r$=2000 Hz). The mass of the plunger essentially low pass filters the pulses of force applied by the drive coil to the plunger to yield an effective steady state position in which the low pass filtered component of the magnetic force pulses applied to the plunger is balanced by the spring bias force. If desired, a separate low pass filter between the phase detector and drive coil may be used to filter the signal provided to the drive coil, but because of the dynamics of the mechanical system 15 such a filter is generally not necessary.

Figure 7:
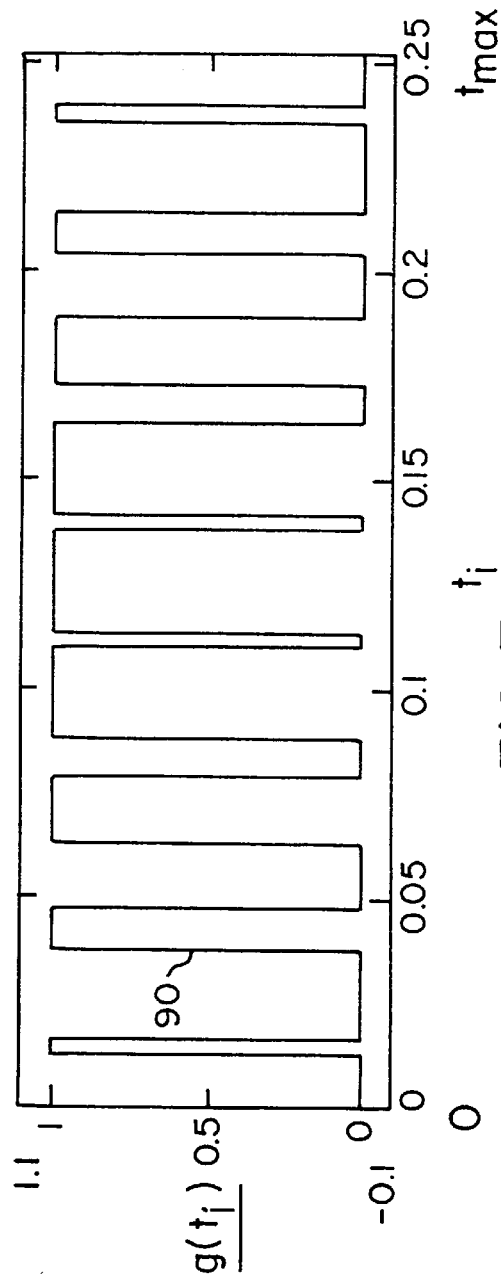
FIG. 7 is an exemplary waveform of the output signal of the phase detector circuit of FIG. 4 where the two oscillator input signals to the phase detector are at different frequencies.

When the frequencies $\omega_r$ and $\omega_f$ of the input signals are not identical, the exclusive OR gate 80 produces a signal based on the effective phase $\Phi_t$ between the two signals, $$\Phi_t = \int_{t_0}^{t} (\omega_f - \omega_r) dt + \Phi_0,$$

where $\Phi_0$ is the effective phase at time $t_0$. As long as the input frequencies differ, the integral will continue to change the value of the effective phase. The duty cycle of the pulse output 90 of the XOR gate 80 will ramp from 0% to 100% and back at a rate determined by the difference of the two input frequencies, as illustrated in FIG. 7. The output signal 90 as shown in FIG. 7 thus has a low frequency component that varies periodically, and the mass-spring system formed by the plunger 36 supported by the springs 37 effectively follows this low frequency component so that the plunger would move periodically from 0% deflection to 100% deflection and back again if the input frequencies $\omega_r$ and $\omega_f$ continued to differ. However, as the plunger moves, it effectively changes the inductance of the coil 55, and eventually the plunger reaches a position at which the frequencies $\omega_r$ and $\omega_f$ are the same, at which point frequency lock is attained. The plunger then stabilizes at a position at which the phase lag between the reference oscillator signal and the variable oscillator signal produces a pulsed output 90 to the drive coil 30 with a pulse duty cycle that provides an effective DC component of magnetic force in the plunger to exactly balance the return force of the springs 37 at the new plunger position.

The phase detector circuit shown in FIG. 4 is a very simple and inexpensive phase detector implementation, and is thus preferred. However, any appropriate phase and/or frequency lock circuit used in phase-locked loops could as well be utilized.

It is understood that the invention is not confined to the particular embodiments set forth herein as illustrative, but embraces all such forms thereof as come within the scope of the following claims.

What is claimed is:

1. A mechanical actuator positioning system comprising:
   (a) a magnetically actuatable movable element;
   (b) a spring connected to the movable element to spring bias the movable element;
   (c) a drive coil coupled to the movable element to apply a magnetic force to the movable element against the force of the spring as a function of the current supplied to the drive coil;
   (d) a sensing coil coupled to the movable element that changes its effective inductance as a function of the position of the movable element;
   (e) a variable oscillator incorporating the sensing coil in a resonant circuit to control the frequency of oscillation of the output signal of the variable oscillator as a function of the inductance of the sensing coil;
   (f) a reference oscillator providing a reference output signal at a selectable frequency; and
   (g) a phase detector receiving the output signals from the variable oscillator and the reference oscillator and providing a pulsed output signal related to the difference in phase and frequency between the two signals, the output signal of the phase detector connected to provide drive power to the drive coil.

2. The mechanical actuator positioning system of claim 1 wherein the phase detector includes an exclusive OR gate.

3. The mechanical actuator positioning system of claim 1 wherein the variable oscillator comprises an operational amplifier having positive and negative inputs, the sensing coil connected with a series capacitor to form a resonant tank circuit in a feedback loop to an input of the operational amplifier, and a resistive circuit connected in a feedback loop to the other input of the operational amplifier, the resistive circuit including a nonlinear resistance that changes the effective resistance of the feedback loop to limit the maximum amplitude of the output signal from the variable oscillator.

4. The mechanical actuator positioning system of claim 1 wherein the movable element is a plunger formed of a ferromagnetic material and the spring is integrally formed with the plunger, and wherein the spring is mounted to a substrate so as to position the plunger above the substrate for freedom of motion of the plunger.

5. The mechanical actuator positioning system of claim 4 wherein the drive and sensing coils are formed around ferromagnetic mandrels which are mounted to magnetic cores formed on the substrate with gaps between them into which portions of the plunger can move, by which the magnetic field from the drive coil is coupled to the plunger and by which the sensing coil is coupled to the plunger.

6. A positioning controller for a mechanical actuator system of the type having a magnetically actuatable movable element, a spring connected to the movable element to spring bias the movable element, a drive coil coupled to the movable element to magnetically attract the movable element against the force of the spring as a function of the current supplied to the drive coil, and a sensing coil coupled to the movable element that changes its effective inductance as a function of the position of the movable element, the controller comprising:
   (a) a variable oscillator incorporating the sensing coil in a resonant circuit to control the frequency of oscillation of the output signal of the variable oscillator as a function of the inductance of the sensing coil;
   (b) a reference oscillator providing a reference output signal at a selectable frequency; and
   (c) a phase detector receiving the output signals from the variable oscillator and the reference oscillator and providing an output related to the difference in phase and frequency between the two signals, the output signal of the phase detector connected to provide drive power to the drive coil.

7. The positioning controller of claim 6 wherein the phase detector includes an exclusive OR gate.

8. The positioning controller of claim 6 wherein the variable oscillator comprises an operational amplifier having positive and negative inputs, the sensing coil connected with a series capacitor in the feedback loop to an input of the operational amplifier, and a resistive circuit connected in a feedback loop to the other input of the operational amplifier, the resistive circuit including a nonlinear resistance that changes the effective resistance of the feedback loop to limit the maximum amplitude of the output signal from the variable oscillator.

9. A method of controlling the position of a movable element of a mechanical actuator, comprising the steps of:
   (a) supporting a movable element of a mechanical actuator connected to a spring to spring bias the movable element, and coupling a drive coil to the movable element to move the same against the force of the spring in relation to the drive current provided to the drive coil;
   (b) coupling a sensing coil to the movable element such that a change in position of the moveable element changes the effective inductance of the sensing coil;

(c) connecting the sensing coil in a resonant circuit of a variable oscillator such that the frequency of the output signal of the variable oscillator varies as a function of the inductance of the sensing coil; and (d) comparing the frequency and phase of the output signal of the variable oscillator to a reference signal at a selected frequency and phase, and providing a pulsed drive signal to the drive coil that is related to the difference between the frequency and phase of the reference oscillator signal and the variable oscillator signal to increase or decrease the current supplied to the drive coil to move the movable element until the frequency of the reference oscillator signal and the variable oscillator signal are the same and until the phase difference between the two signals provides a drive signal to the drive coil sufficient to provide magnetic force to the movable element to balance the spring bias force to maintain the movable element in a stationary position.

10. The method of claim 9 including the step of changing the frequency of the reference signal to a new frequency to thereby change the position of the movable element.

* * * * *